Aug. 7, 1923.
E. R. FELLOWS
1,463,806
HIGH SPEED GEAR GENERATING MACHINE
Filed Sept. 30, 1921      3 Sheets-Sheet 1
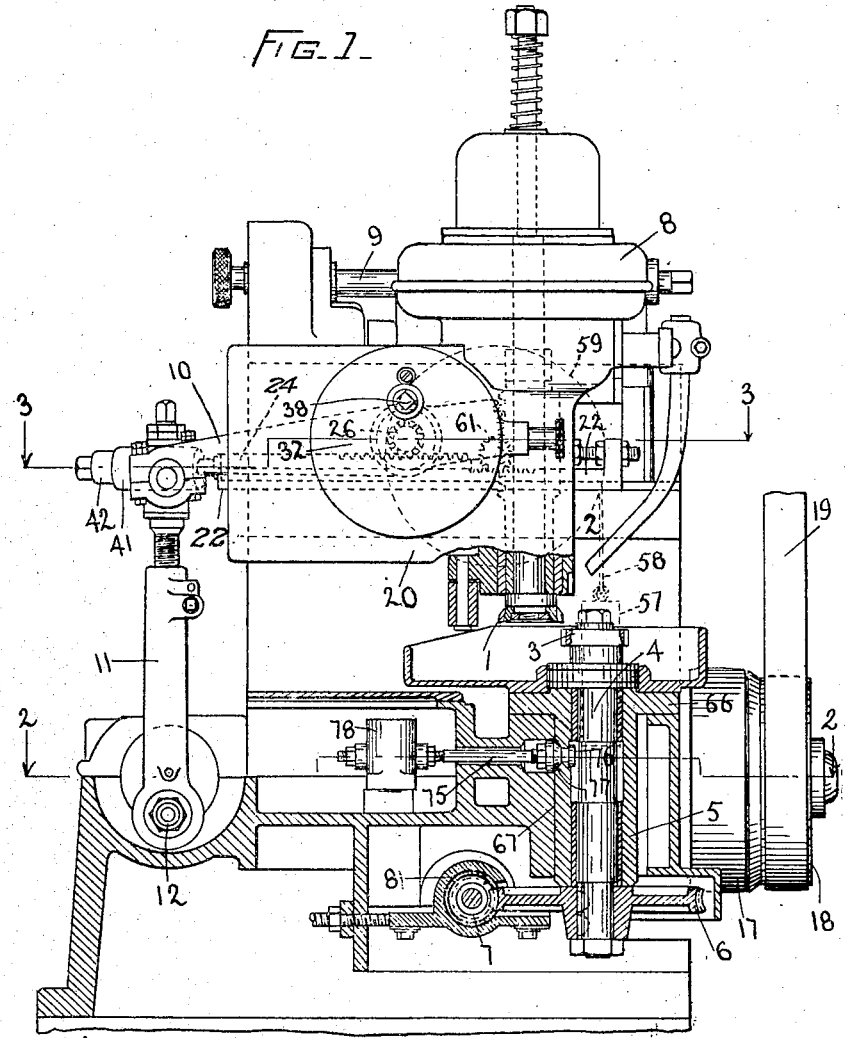
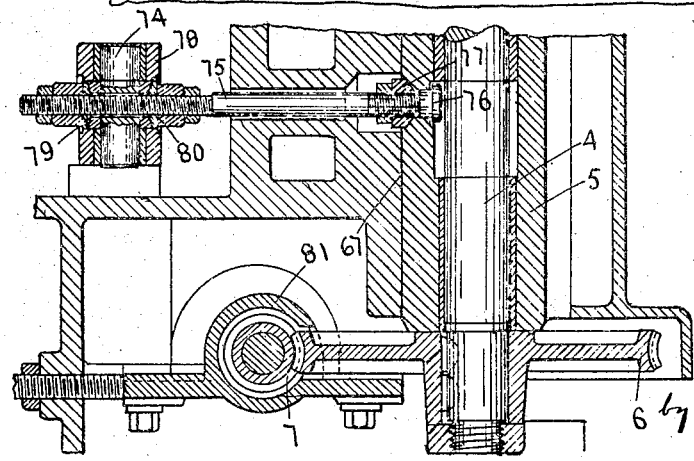
INVENTOR
E. R. Fellows
ATTYS

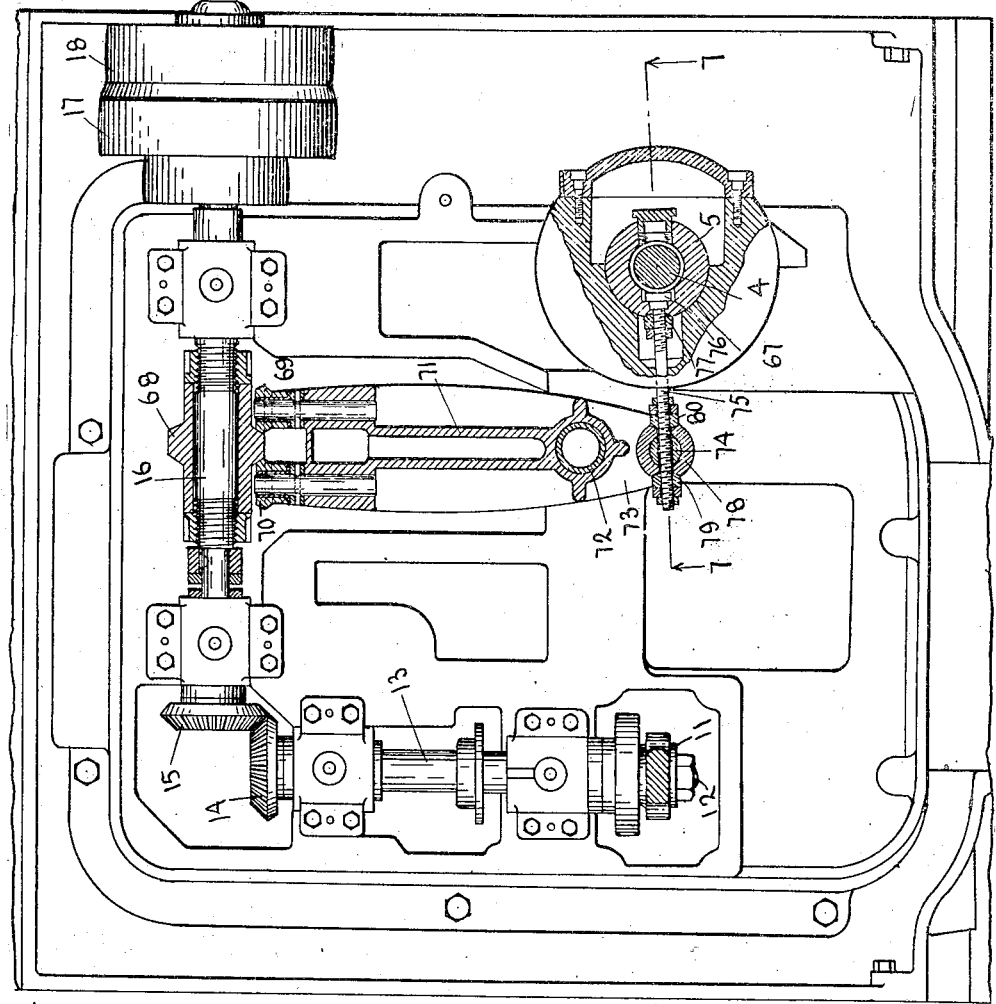

Aug. 7, 1923.
E. R. FELLOWS
1,463,806
HIGH SPEED GEAR GENERATING MACHINE
Filed Sept. 30, 1921
3 Sheets-Sheet 3
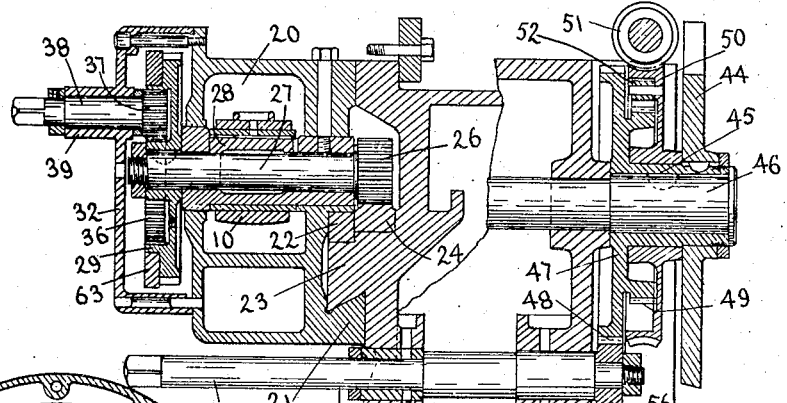
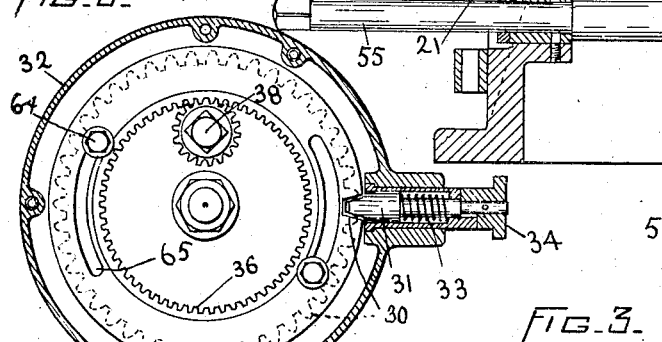
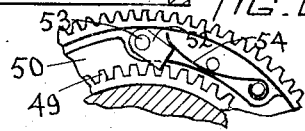
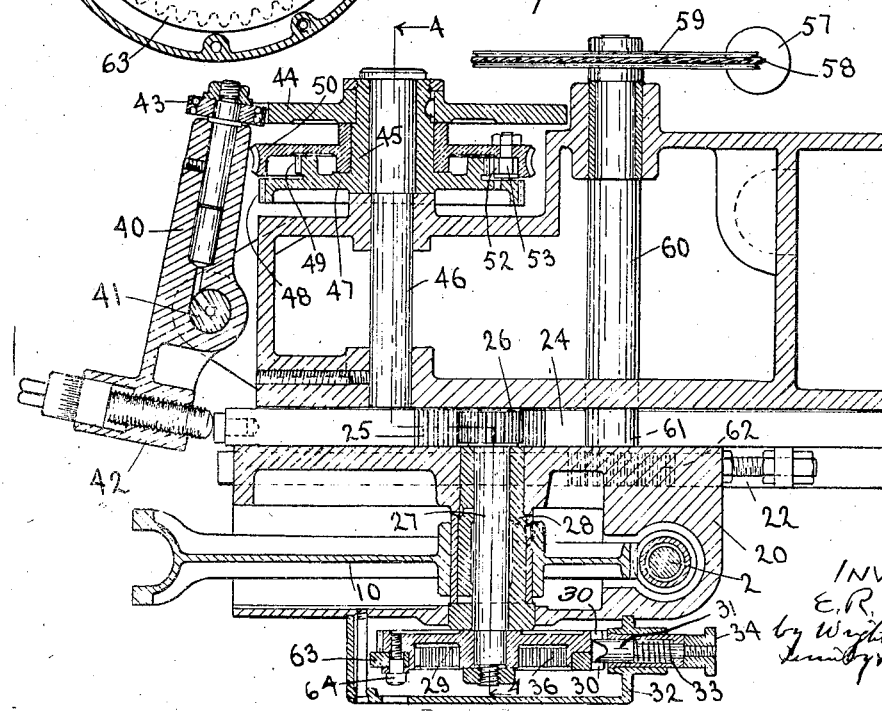
INVENTOR:
E. R. Fellows
by Wright, Brown,
Quinby & Hay
Attys Patented Aug. 7, 1923.

1,463,806

UNITED STATES PATENT OFFICE.

EDWIN R. FELLOWS, OF SPRINGFIELD, VERMONT, ASSIGNOR TO THE FELLOWS GEAR SHAPER COMPANY, OF SPRINGFIELD, VERMONT, A CORPORATION OF VERMONT.

HIGH-SPEED GEAR-GENERATING MACHINE.

Application filed September 30, 1921. Serial No. 504,437.

*To all whom it may concern:*

Be it known that I, EDWIN R. FELLOWS, a citizen of the United States, residing at Springfield, in the county of Windsor and State of Vermont, have invented new and useful Improvements in High-Speed Gear-Generating Machines, of which the following is a specification.

This invention relates to machines adapted to cut gears at high speed, with utilization of the principle disclosed in prior patents secured by me of cutting grooves in the face of a gear blank by a gear-shaped planing cutter, and generating in the sides of such grooves the correct curves of gear teeth by giving simultaneous rotary movements to the cutter and gear blank of the same character as the movements of a pair of intermeshing conjugate gears.

More particularly, the invention is an improvement on the type of high speed gear shaper disclosed in my pending application, Serial Number 351,126, filed January 13, 1920. The invention has the same objects as those set forth in the aforesaid application, and the further object of adapting the high speed type of gear-generating machine to a wider range of work, by enabling a single machine of a given size to turn out finished work of a wider range of sizes than is possible with the machine illustrated in the aforesaid application.

These further objects are accomplished by a novel mode of adjusting and feeding the cutter for depth of cut, and a new and improved mode of backing off the work during the return strokes of the cutter, and of holding the work in position to be cut during the cutting strokes of the cutter; as is shown in full detail in the drawings furnished with this specification, and explained in detail in the following description of said drawings.

In the drawings:

Figure 1 is a side elevation, with parts of the machine broken away and shown in section, of a high speed gear-generating machine, in which are embodied the new features of the present invention.

Figure 2 is a plan view and horizontal section, taken on line 2—2 of Figure 1.

Figure 3 is a horizontal section, taken on the line 3—3 of Figure 1.

Figure 4 is a vertical section, taken on the line 4—4 of Figure 3.

Figure 5 is a front elevation of a detail of the cutter feeding and adjusting means, a part of such means being broken away and shown in section.

Figure 6 is a fragmentary elevation of another part of the cutter feeding mechanism.

Figure 7 is a vertical section of a part of the mechanism by which the work is backed away from the cutter during the non-cutting strokes of the latter, this view being an enlargement of a part of the mechanism shown in Figure 1, and being taken on the line 7—7 of Figure 2.

Like reference characters designate the same parts wherever they occur in all the figures.

In the main, the machine here represented is like that shown in the aforesaid application, Serial Number 351,126, wherefore brief description only of all of the common features is all that is necessary herein, and reference is directed to the prior application for subject-matter omitted from the present one.

The cutter 1 is carried by a rotatable and endwise movable spindle 2, and it is adapted to cut correctly formed teeth in a work piece or gear blank 3, by a combination of endwise planing movements, and rotation about its axis simultaneously with rotation of the gear blank about the axis of the latter in the opposite direction and with equal linear speed at its pitch circle to the pitch circle speed of the cutter.

The work piece is carried by a work spindle 4, which rotates in a quill or sleeve 5. Rotary movement is given to the work piece by a worm gear 6 keyed to the work spindle, which is driven by a worm 7; and a similar worm gear confined in a gear case 8 imparts rotary movement to the cutter spindle under the driving action of a worm carried by a shaft 9. Reciprocating movement is given to the cutter spindle by a lever 10, having a segment gear in mesh with a rack associated with the cutter spindle, in the manner shown in the aforesaid application, which lever is oscillated by a connecting rod 11, coupled to a crank pin 12 on a shaft 13 (Figure 2), driven by miter gears 14 and 15 from a main shaft 16, on which are fast and loose pulleys 17 and 18 adapted to receive a belt 19.

The cutter spindle and its driving means are mounted in a slide 20, having gibs 21 and 22 (Figure 4), which embrace a guide rib 23 on the machine frame. Thus the cutter carriage or slide is so movable as to carry the cutter toward and away from the work piece. It is adapted to be so moved by both automatic and manually-operated mechanisms, consisting of the following parts. Rack bar 24 is mounted upon the guideway 23, in a manner permitting it to slide endwise parallel with the movement of the cutter carriage, and the teeth 25 of its rack mesh with the pinion 26, carried by a shaft 27, which has a bearing in a bushing 28 fixed in the carriage. This bushing serves also as the pivot supporting the lever 10, which gives reciprocative movement to the cutter spindle. On the shaft 27 there is made fast, by a key or otherwise, a toothed wheel or segment 29, having a series of external teeth 30, any of which may be entered by a locking pin 31, mounted in a cover 32, which is rigidly secured to the slide or carriage 20. The locking pin is adapted to slide in or out with respect to the wheel 29, and is pressed toward the latter by a spring 33. It carries a knob 34, by which it may be withdrawn to release the pin. In effect the pinion 26 is an adjustable coupling between the carriage and the bar 24, through which feeding movement is given to the carriage and the wheel 29 and pin 31 form a lock capable of securing such coupling in its adjustments.

The same wheel 29 is provided with a series of internal gear teeth 36, with which meshes a pinion 37 on a shaft 38, having its bearing in a sleeve 39 on the cover 32, and formed for application of a crank or wrench whereby it may be rotated by hand.

One end of the rack bar 24 is exposed at the rear side of the machine, and is pressed upon by one arm of a lever 40, pivoted on a fixed stud 41. That part of the lever which bears on the rack bar is a screw 42, threaded through the lever arm, as shown in Figure 3. The other arm of the lever carries an anti-friction roll 43, which bears on the edge of a disk cam 44, which is made fast by a key, or by friction or otherwise to a bushing 45 mounted rotatively on a stud shaft 46. Said bushing 45 is an extension of the hub of a compound gear 47, having a series of spur gear teeth 48, on its periphery and a second series of teeth 49 on a concentric rib which projects into an annular recess in the side of a worm gear 50, which is mounted to turn freely about the bushing 45. A worm 51, driven by the feed mechanism in essentially the manner explained in the aforesaid application (such worm corresponding to the worm designated 67 in the prior application), rotates the worm wheel whenever the machine is in action.

A pawl 52 (Figures 3 and 6) is pivoted by a pin 53 to the worm wheel 50, and is pressed by a spring 54 towards the teeth 49, such teeth forming, in effect, a ratchet complemental to the pawl 52. Through this ratchet and pawl couple, the worm 50 is adapted to drive the cam 44, but the cam may be moved ahead of the worm gear by force otherwise applied to it. Thus the cam may be driven by rotation of a shaft 55, which turns in bearings in the frame, and carries a pinion 56, in mesh with the gear element 48; such shaft being turned by the operator with the aid of a crank or wrench applied to its exposed end.

It will now be understood that, when the toothed wheel 29 is prevented by the locking pin 31 from rotating, the cutter carriage is locked to the rack bar 24, wherefore the cam 44, acting on said bar through the lever 40, is able to feed the cutter toward the center of the work piece so as to cut teeth in the latter of the proper depth; while, by manual rotation of the shaft 55, the cutter can be brought up close to the work before the machine is put into automatic action. It is to be understood that the shape of the cam 44 permits withdrawal of the cutter, so as to give room for removal of the work after completion of the cutting cycle, as fully explained in my prior application.

A weight 57 is suspended, by means of a cord or chain 58, from a wheel 59 on a shaft 60, which shaft carries a pinion 61, which meshes with rack teeth 62, cut in the gib 22, which is made fast to the cutter carriage, and thereby a constant yielding force is exerted on the carriage opposite to the force which is applied by the cam; whereby, not only is all looseness between the cam and the carriage taken up, but the carriage is withdrawn from the work when a properly formed recession of the cam permits it.

Adjustment of the cutter to accommodate work pieces of different diameter is made by rotating the shaft 38, and thereby rolling the pinion 26 over the rack bar 24. The closeness of adjustment possible by this means is limited by the distance between the notches of the wheel 29. Finer adjustments are made after locking the wheel 29, by turning the adjusting screw 42, the projecting shank of which has measuring graduations, cooperating with a fixed index on the lever arm through which the screw passes. This adjusting mechanism also permits the work carrier to be withdrawn farther from the work than the normal distance of recession permitted by the feed cam, when special circumstances make such extra movement necessary to permit removal of the work. To insure in such cases that the cutter thereafter will be brought up to exactly the same distance from all duplicate work pieces, there is provided a cover plate 63, which has only one notch in its circumference, and is mounted on the end face of wheel 29 so as to cover all of the external notches in the latter except one. It is adjustable angularly about the axis of the wheel 29, and is clamped by screws 64, passing through arcuate slots 65 in the cover plate, and threaded into the wheel. This cover plate is properly set when the cutter carriage is adjusted for the first gear to be cut of any lot of duplicate gears, the character of which is such as to require greater than normal recession of the cutter to permit their placement and removal.

The work piece is backed off from the cutter after each cutting stroke, in order to avoid severe rubbing contact of the cutter on the work during the non-cutting stroke. For this purpose, the work spindle bearing sleeve 5 is freely movable laterally with respect to the fixed machine frame. It is formed with a flange 66, which rests on the immediately subjacent part of the frame, and the bearing sleeve otherwise fits in an upright recess 67 in the frame at the side of the work spindle toward the axis of the cutter spindle. The sides of this recess converge to form a rigid seat against which the bearing sleeve is firmly held and by which it is centered while the cutting strokes take place, and from which it is removed when the return strokes of the cutter are made. It is thus moved by a cam rib 68, fast to the main shaft 16, which plays between rolls 69 and 70 on the two branches of a forked lever arm 71, which oscillates about a pivot stud 72, and has a short arm 73, carrying a crank pin 74, connected by an endwise adjustable link 75 with the bearing sleeve. This link passes through a hole in the sleeve, and has an enlarged head 76, overlapping the inner end of the hole, and carries an adjustable take-up nut 77 to bear on the outside of the sleeve. The link also passes through an enlarged hole in the crank pin 74, and through a sleeve 78 surrounding said pin and being rotatable thereon. Adjustable nuts 79 and 80 on the link at opposite sides of sleeve 78 provide for adjustment endwise of the link and for taking up looseness. Oscillation of the lever 71—73 is caused by the cam 68 to take place in the proper direction and in proper time with the strokes of the cutter for obtaining the effects above stated. When the work spindle is consequently displaced, the worm wheel 6 moves away from and toward the driving worm 7, the bearing and housing 81 of which is made fast to the spindle frame, but the displacement of the worm wheel is not great enough to bring its teeth out of mesh with the worm.

The provisions for backing off and seating the work spindle herein described have the important, useful result that when the work is backed off it is free from lateral restraint and is thereby enabled to find the correct withdrawal angle; that is, the work piece is able to back off in such a direction that the toothlike projections of the cutter are not pressed rigidly against either side of the cut in the work. This is an essential result, and it is accomplished by the means here shown in connection with cutters and work pieces of any diameter and having teeth of any pitch and length which the machine is otherwise able to accommodate; that is, the backing-off means does not in itself impose any limits upon the range of sizes and pitches of gears which can be cut in a machine of a given size.

Another advantage results from the fact that the worm remains stationary while the work carrier is backed off and returned. Thus the weight of the parts which must be moved at these times is reduced to the minimum, which is an important item in a machine designed to operate at high speed. This particular machine is capable of cutting at the rate of from 500 to 1000 strokes per minute, and of course makes an equal number of displacements of the work holder in the same time.

What I claim and desire to secure by Letters Patent is:

1. A gear generating machine comprising, in combination, with a continuously rotatable gear-like planing cutter and a continuously rotatable work holder, one of which is movable toward and away from the other transversely to the direction of the cutting movement, mechanism for effecting relative cutting movements between said cutter and work holder, and a carriage for that one of the aforesaid elements which is so movable, mechanism constructed and operable for gradually thus moving said carriage to effect a predetermined depth feed of the cutter into the work piece, to hold the cutter and work piece in the relation so obtained while the cutting action proceeds to completion of the work, and to effect separation between the cutter and work piece on completion of the latter, and means for adjusting the carriage relatively to said mechanism, whereby the position on the machine of the path in which it is so moved may be varied.

2. In a gear-cutting machine, a base frame, a carriage movable on said frame for adjustment and feeding purposes, a sliding member movable parallel with the carriage, an automatic carriage-impelling mechanism bearing on said sliding member constructed to give a gradual feeding movement thereto during the cutting action, and means for adjusting and locking the carriage relatively to the sliding member.

3. In a gear-cutting machine, a base frame, a carriage movable on said frame for adjustment and feeding purposes, a rack bar arranged and movable in parallel with the carriage, a pinion rotatably mounted on the carriage in mesh with the rack bar, by rotation of which the position of the carriage relatively to the bar may be altered, and feed mechanism arranged to apply pressure on said rack bar for moving the same and the carriage in unison.

4. In a gear-cutting machine, a base frame, a carriage movable on said frame for adjustment and feeding purposes, a rack bar arranged and movable in parallel with the carriage, a pinion rotatably mounted on the carriage in mesh with the rack bar, by rotation of which the position of the carriage relatively to the bar may be altered, locking means constructed and adapted to secure the pinion immovably to the carriage, and feed mechanism arranged to apply pressure on said rack bar for moving the same and the carriage in unison.

5. A gear-generating machine, including, in combination with a cutter spindle and a work spindle, a sliding carriage by which one of the members constituted by the cutter spindle and work holder is moved for adjustment and depth feed, a feed cam, a bar movable approximately in parallel with the carriage adapted to receive movement from said cam, and complemental driving and adjusting means arranged on the carriage and bar respectively, by which the former is adjusted relatively to the bar.

6. In a machine tool, a carriage movable for adjustment and feeding, a mechanically-operated lever, a bar arranged and movable approximately in parallel with said carriage, to receive motion from said lever and to impart movement to said carriage, and complemental gear elements mounted on the carriage and bar adapted respectively for shifting one relatively to the other.

7. In a machine tool, a carriage movable for adjustment and feeding, a mechanically-operated lever, a bar arranged to be moved by said lever approximately in parallel with said carriage and to impart movement to the carriage, complemental gear elements mounted on the carriage and bar adapted respectively for shifting one relatively to the other, and locking means for securing that gear element which is mounted on the carriage from movement relatively thereto, whereby the carriage is locked fast to the bar.

8. In a machine tool, a feeding cam, a lever bearing on said cam and adapted to be moved thereby, a carriage movable on the machine, a bar having a series of rack teeth located and movable in parallel with the cam, a pinion rotatively mounted in the carriage in mesh with said rack teeth, means for locking the pinion to the carriage in various positions of rotational displacement, and an adjusting screw carried by the lever and arranged to apply force therefrom upon said bar in the direction in which the latter is capable of moving.

9. In a gear cutting machine, a base, a carriage mounted movably on said base for adjustment and feeding purposes, a sliding member movable with said carriage and capable also of independent movement relatively thereto in the same directions, carriage-impelling mechanism in motion-effecting engagement with said sliding member, an adjustable coupling between the carriage and sliding member operable to alter the position of one relatively to the other, a releasable lock for securing said coupling in various positions with respect to the carriage, and means cooperating with said lock for ensuring return of the carriage and sliding member to a predetermined relation after displacement from such relation.

10. In a gear cutting machine, a base, a carriage mounted movably on said base for adjustment and feeding purposes, a sliding member movable with said carriage and capable also of independent movement relatively thereto in the same directions, carriage-impelling mechanism in motion-effecting engagement with said sliding member, an adjustable coupling between the carriage and sliding member operable to alter the position of one relatively to the other, a rotatable toothed element connected with said coupling to be moved rotatably whenever the latter is adjusted, a complemental locking member cooperating with the teeth of said toothed element for locking the coupling in its adjustments, and a shield adjustably connected with said toothed element and constructed to exclude said complemental locking member from engagement with the teeth of said toothed element on either side of a selected tooth space.

11. In a gear cutting machine, a base, a carriage mounted movably on said base for adjustment and feeding purposes, a sliding member movable with said carriage and capable also of independent movement relatively thereto in the same directions, carriage-impelling mechanism in motion-effecting engagement with said sliding member, an adjustable coupling between the carriage and sliding member operable to alter the position of one relatively to the other, a toothed wheel connected with said coupling in a manner to be rotated whenever the coupling is adjusted, a complemental locking pin mounted on the carriage and adapted to be entered into selected spaces in said toothed wheel, and a disk mounted beside said wheel and angularly adjustable with respect thereto, having its circumference arranged to exclude said locking pin from engagement with the teeth of said wheel, but such circumference being formed with a notch adapted to admit the locking pin and to be placed beside selected tooth spaces of the wheel.

12. In a machine tool, a carriage, a feed-controlling impeller adapted to give movement to said carriage in one direction, a bar movable independently of the carriage in parallel therewith, against which the effort of said impeller is applied, said bar and carriage having co-operating gear elements by the rotation of one of which relative movement is imparted to the other, a weight, and a rotatable pinion geared to said carriage, to which the weight is connected in a fashion such as to apply force to the carriage in opposition to the force applied thereto from said impeller.

13. A gear-cutting machine, including a main frame, a carriage mounted on said frame, a cutter spindle reciprocably and rotatively supported in said carriage, a tubular bushing secured in the carriage, a lever pivotally supported on said bushing and having engagement with the spindle for reciprocating it, a shaft having its bearing inside of said bushing, a pinion on said shaft, a bar movable in parallel with the carriage and having a series of teeth with which said pinion is in mesh, means for rotating and means for locking said shaft with respect to the carriage, and an automatically driven impeller arranged to exert force on said bar in one of the directions in which the latter is movable.

14. A gear-cutting machine, including a main frame, a carriage mounted on said frame, a cutter spindle reciprocably and rotatively supported in said carriage, a tubular bushing secured in the carriage, a lever pivotally supported on said bushing and having engagement with the spindle for reciprocating it, a shaft having its bearing inside of said bushing, a pinion on said shaft, a bar movable in parallel with the carriage and having a series of teeth with which said pinion is in mesh, means for rotating and means for locking said shaft with respect to the carriage, an automatically driven impeller arranged to exert force on said bar in one of the directions in which the latter is movable, and a yieldingly-actuated gear element in mesh with teeth on the carriage, arranged to exert force thereon yieldingly in opposition to the force applied by the impeller.

15. A gear generating and cutting machine, including an axially-reciprocable gear-shaped planing cutter, a work spindle adapted to carry a gear blank in position to have its surface cut by the cutter, a frame having a recess with converging walls arranged to receive the bearing of said work spindle, and mechanism connected with said bearing and operative to move it alternately into firm engagement with the walls of said recess and outward therefrom, the bearing being otherwise supported with freedom to move laterally.

16. A gear-generating machine, having a reciprocable and rotatable gear-shaped planing cutter, a rotatable work holder, a bearing for said holder movable toward and away from the line in which the cutter reciprocates, a rigid seat having converging walls to which said holder is fitted, and mechanism arranged and operative to force the holder against said seat while the cutting strokes of the cutter take place, and to withdraw the holder therefrom while the return strokes of the cutter take place, said holder being otherwise supported in a manner permitting its free lateral movement in all directions, and said mechanism being so articulated that the holder in being withdrawn is enabled to take a path whereby both sides of the toothlike projections of the cutter which enter the work are relieved from forcible contact therewith.

17. In a gear-generating machine, having a planing cutter spindle and a work-holding spindle which are rotatable in unison and one of which is movable endwise for cutting, a bearing holding one of said spindles and being supported with freedom to move laterally in all directions, a seat having converging walls to which said bearing is fitted, and mechanism coupled to the bearing and operative to move the bearing into forcible contact with the seat and away therefrom, said mechanism being otherwise flexible to permit the bearing to travel at such times in a path determined by the direction of penetration of the cutter into the work.

In testimony whereof I have affixed my signature.

EDWIN R. FELLOWS.